(No Model.)
H. F. WATSON.
TUBE OR HOSE.
No. 588,785. Patented Aug. 24, 1897.
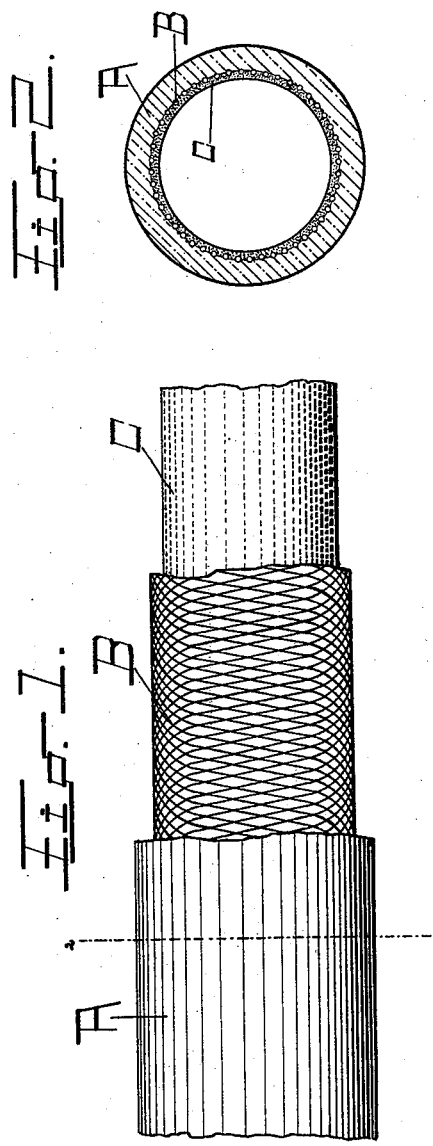
WITNESSES:
John Lord.
W. G. August.
INVENTOR
Harrison F. Watson
BY
Hallock & Lord
ATTORNEY.

UNITED STATES PATENT OFFICE.

HARRISON F. WATSON, OF ERIE, PENNSYLVANIA.

TUBE OR HOSE.

SPECIFICATION forming part of Letters Patent No. 588,785, dated August 24, 1897.

Application filed September 9, 1896. Serial No. 605,243. (No model.)

*To all whom it may concern:*

Be it known that I, HARRISON F. WATSON, a citizen of the United States, residing at Erie, in the county of Erie and State of Pennsylvania, have invented certain new and useful Improvements in Tubes or Hose; and I do hereby declare the following to be a full, clear, and exact description of the invention, such as will enable others skilled in the art to which it appertains to make and use the same.

This invention relates to tubes or hose; and it consists in certain improvements in the construction thereof, as will be hereinafter fully described, and pointed out in the claims.

Heretofore tubes or hose have been formed with a textile fabric of asbestos made impervious by means of a vulcanized rubber wall. So far as I am aware two methods have been employed—one in which the fabric is incorporated in the rubber wall by vulcanizing an inner and outer coating of rubber on the fabric. In the structure made by the other method a rubber tube is lined with an asbestos fabric, the asbestos being exposed to the direct action of the matter passed through the tube. In practice tubes or hose formed by both these methods have been found to be defective. Where the fabric is incorporated with the rubber, it is so affected by the vulcanization as to crack or break in use, and where the fabric is exposed as an inner lining it is softened and disintegrated by use, so that in both instances the tube or hose is weakened. I have devised a structure which is free from these defects. It is illustrated as follows.

Figure 1 shows a side view of the hose, the layers being successively broken away, thus exposing each layer. Fig. 2 shows a section on the line 2 2 in Fig. 1.

A marks an outer wall of rubber, preferably secured to an asbestos fabric B by vulcanization, and C an inner layer or lining of waterproof material unvulcanized. The tube of asbestos is formed, preferably, by braiding, so as to be seamless. The waterproof material may be in the form of a coating or wash which surrounds and protects the several threads or elements of the fabric, but I prefer that the waterproof material form a layer or wall impervious in itself, and it is so illustrated, and when the waterproof material forms a layer or wall that is in itself impervious the rubber or vulcanized wall may be omitted, depending largely on the purpose for which it is to be used. Where it is desired to protect the outer surface, the order of the layers may be reversed, and where both surfaces are to be protected by the fabric both surfaces may be coated with the waterproofing material.

In forming the structure shown the waterproof inner layer may be applied to the fabric and the wall of the rubber formed over the fabric and then vulcanized. Where this is done, the waterproofing material should be of a non-vulcanizing substance. By another method the rubber wall may be formed on the fabric and vulcanized and then the waterproofing material applied. In this instance vulcanizing compositions may be used for the inner layer or coating, but if used they should not be vulcanized. One surface of the fabric, however the structure may be formed, should not be covered by the vulcanized substance forming the rubber wall, but should be coated and protected by the waterproof material unvulcanized. By so exposing the fabric the deteriorating of a complete incorporation in the vulcanized substance is obviated, and by coating this exposed fabric with a waterproof material unvulcanized the fabric is protected without impairing its strength, so as to prevent disintegration.

The compositions forming the walls may be varied. The unvulcanized coating should protect the fabric from the matter with which the tube is used. It should therefore be steam-proof, acid-proof, &c., according to the purpose for which it is intended, but in each case should be unvulcanized.

I have found the following composition desirable for most purposes: ozocerite, maltha, and silicate of soda, (the drier,) equal parts, into which has been mixed fine-ground asbestos, talc, and soapstone until a paste of good working consistency has been formed.

What I claim as new is—

1. As an article of manufacture, a tube or hose, the walls of which are impervious to fluids and comprise a textile fabric of asbestos provided with a coating of unvulcanized waterproof material.

2. As an article of manufacture, a tube or hose the walls of which are formed of a layer of vulcanized rubber; a textile fabric of asbestos next said layer of rubber with one surface of the fabric exposed from the rubber layer; and a protecting-coating of unvulcanized waterproof material on said exposed surface of the fabric.

3. As an article of manufacture, a tube or hose the walls of which are formed of a layer of vulcanized rubber; a textile fabric of asbestos next said layer of rubber with one surface of the fabric exposed from the rubber layer; and a protecting-coating of unvulcanized waterproof material forming an impervious layer in itself on said exposed surface of the fabric.

4. As an article of manufacture, a tube or hose, the walls of which are formed of a layer of vulcanized rubber; an asbestos textile fabric attached to said layer by vulcanization, with one surface of the fabric exposed from the rubber layer; and a protecting-coating of unvulcanized waterproof material on said exposed surface of the fabric.

5. As an article of manufacture, a tube or hose, the walls of which are formed of a layer of vulcanized rubber; an asbestos textile fabric attached to said layer by vulcanization with one surface of the fabric exposed from the rubber layer; and a protecting-coat of unvulcanized waterproof material forming in itself an impervious layer on said exposed surface of the fabric.

In testimony whereof I affix my signature in presence of two witnesses.

HARRISON F. WATSON.

Witnesses:
JOHN LORD,
H. C. LORD.